(12) United States Patent
Speck et al.

(10) Patent No.: US 9,782,676 B2
(45) Date of Patent: Oct. 10, 2017

(54) SYSTEM AND METHOD FOR RETAINING SYSTEM STATE

(71) Applicant: Sony Interactive Entertainment America LLC, San Mateo, CA (US)

(72) Inventors: John Speck, Palo Alto, CA (US); Stephen G. Perlman, Palo Alto, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 52 days.

(21) Appl. No.: 14/923,359

(22) Filed: Oct. 26, 2015

(65) Prior Publication Data
US 2016/0045826 A1    Feb. 18, 2016

Related U.S. Application Data

(63) Continuation of application No. 13/016,794, filed on Jan. 28, 2011, now Pat. No. 9,168,457, and a continuation-in-part of application No. 14/484,641, filed on Sep. 12, 2014, now Pat. No. 9,700,790, which
(Continued)

(51) Int. Cl.
| | | |
|---|---|---|
| *A63F 13/30* | (2014.01) | |
| *A63F 13/35* | (2014.01) | |
| *A63F 13/358* | (2014.01) | |
| *A63F 13/335* | (2014.01) | |

(Continued)

(52) U.S. Cl.
CPC .......... *A63F 13/358* (2014.09); *A63F 13/12* (2013.01); *A63F 13/335* (2014.09); *A63F 13/35* (2014.09); *A63F 13/355* (2014.09); *A63F 13/493* (2014.09); *A63F 2300/407* (2013.01); *A63F 2300/534* (2013.01); *A63F 2300/535* (2013.01); *A63F 2300/538* (2013.01); *A63F 2300/554* (2013.01); *A63F 2300/636* (2013.01)

(58) Field of Classification Search
CPC ........ A63F 13/12; A63F 13/35; A63F 13/355; A63F 13/358; A63F 13/49; A63F 13/493; A63F 2300/50; A63F 2300/534; A63F 2300/535; A63F 2300/538
See application file for complete search history.

(56) References Cited

U.S. PATENT DOCUMENTS

| | | | | |
|---|---|---|---|---|
| 6,389,005 B1 * | 5/2002 | Cruickshank | ....... | H04L 12/2856 370/352 |
| 6,785,262 B1 * | 8/2004 | Yao | ....... | G10L 19/002 370/352 |

(Continued)

*Primary Examiner* — Khang Do
(74) *Attorney, Agent, or Firm* — Martine Penilla Group, LLP

(57) ABSTRACT

An apparatus and method are described for retaining system state of an online application such as a video game. For example, a method according to one embodiment comprises: executing a application on a server in response to user input from a client; transmitting video generated by the application over a network connection from the server to the client; detecting that the network connection has become unusable or impaired; responsively pausing the execution of the application from a current point of execution; and resuming the execution of the application from the current point of execution upon detecting that the network connection has become usable or unimpaired.

16 Claims, 3 Drawing Sheets

Related U.S. Application Data is a continuation of application No. 11/999,461, filed on Dec. 5, 2007, now Pat. No. 8,893,207.

(60) Provisional application No. 61/382,842, filed on Sep. 14, 2010.

(51) Int. Cl.
*A63F 13/355* (2014.01)
*A63F 13/493* (2014.01)

(56) References Cited

U.S. PATENT DOCUMENTS

| | | | | |
|---|---|---|---|---|
| 7,778,326 | B1* | 8/2010 | Chen | H04L 47/10 |
| | | | | 370/468 |
| 7,913,283 | B2* | 3/2011 | White | H04N 7/17318 |
| | | | | 725/102 |
| 8,050,289 | B1* | 11/2011 | Masterson | H04N 21/2343 |
| | | | | 370/465 |
| 8,423,071 | B1* | 4/2013 | Sun | H04L 65/80 |
| | | | | 370/318 |
| 2004/0097288 | A1* | 5/2004 | Sloate | A63F 13/12 |
| | | | | 463/42 |
| 2005/0136897 | A1* | 6/2005 | Praveenkumar | H04L 29/06 |
| | | | | 455/414.1 |
| 2006/0029034 | A1* | 2/2006 | Lum | H04L 43/0811 |
| | | | | 370/351 |
| 2008/0288983 | A1* | 11/2008 | Johnson | G06Q 30/02 |
| | | | | 725/46 |
| 2010/0248843 | A1* | 9/2010 | Karsten | G07F 17/32 |
| | | | | 463/43 |
| 2011/0263332 | A1* | 10/2011 | Mizrachi | A63F 13/12 |
| | | | | 463/42 |

* cited by examiner

SYSTEM AND METHOD FOR RETAINING SYSTEM STATE

CLAIM OF PRIORITY

This application is a continuation application of U.S. application Ser. No. 13/016,794, entitled, "SYSTEM AND METHOD FOR RETAINING SYSTEM STATE," filed on Jan. 28, 2011, which claims priority from U.S. Provisional Application No. 61/382,842 entitled, "SYSTEM AND METHOD FOR RETAINING SYSTEM STATE", filed on Sep. 14, 2010, which are incorporated by reference.

This application is a continuation-in-part of U.S. application Ser. No. 14/484,641, entitled, "SYSTEM AND METHOD FOR COMPRESSING STREAMING INTERACTIVE VIDEO", filed on Sep. 12, 2014, which is a continuation of U.S. application Ser. No. 11/999,461, entitled, "SYSTEM AND METHOD FOR COMPRESSING STREAMING INTERACTIVE VIDEO", filed on Dec. 5, 2007, which are incorporated by reference.

TECHNICAL FIELD

The present disclosure relates generally to the field of data processing systems and, more particularly, to retaining system state with real-time interactive streaming compressed video.

BRIEF DESCRIPTION OF THE DRAWINGS

The present disclosure will be understood more fully from the detailed description that follows and from the accompanying drawings, which however, should not be taken to limit the disclosed subject matter to the specific embodiments shown, but are for explanation and understanding only.

DETAILED DESCRIPTION

Figure 1A:
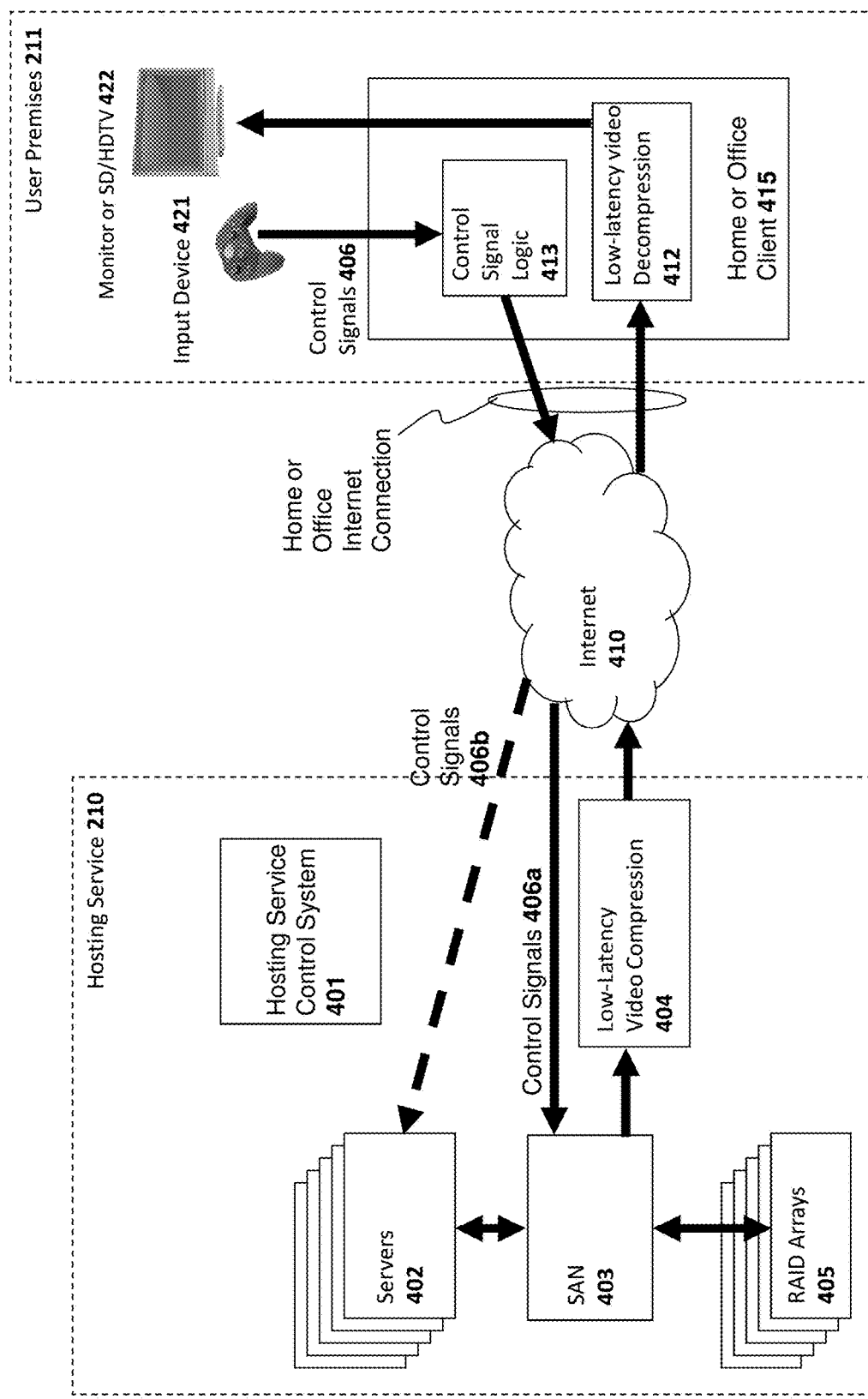
FIG. 1a illustrates a hosting service and a client employed according to one embodiment.

The assignee of the present application has developed an online video gaming and application hosting system. Certain embodiments of this system are described, for example, in U.S. patent application Ser. No. 10/315,460 (U.S. Application No. 20040111755), filed Dec. 10, 2002; U.S. patent application Ser. No. 12/538,081, filed, Aug. 7, 2009, entitled, "System and Method for Compressing Video Based on Latency Measurements and Other Feedback"; and U.S. application Ser. No. 12/359,150, filed Jan. 23, 2009, entitled "System And Method for Protecting Certain Types of Multimedia Data Transmitted Over A Communication Channel." These applications are sometimes referred to herein as the "co-pending applications" and are incorporated herein by reference.

In one embodiment, a computer-implemented method is disclosed. The method includes executing an application on a server in response to user input from a client and compressing video output from the application to generate interactive compressed streaming video. The method further includes transmitting the interactive compressed streaming video generated by the application over a network connection from the server to the client. The method includes detecting that the network connection has become unusable or impaired and responsively pausing the execution of the application from a current point of execution and halting transmission of the interactive compressed streaming video. The method includes resuming the execution of the application from the current point of execution and resuming transmission of the interactive compressed streaming video upon detecting that the network connection has become usable or unimpaired.

In one implementation of the method, the method includes detecting that the network connection has become impaired comprises detecting that the network bandwidth drops below a specified threshold.

In one implementation of the method, the specified threshold is based on the bandwidth required to deliver real-time video of the application to the client at a specified resolution. In one embodiment, the hosting service initially assesses the available maximum data rate and latency of the channel to determine an appropriate data rate for the video stream and then dynamically adjusts the data rate in response. To adjust the data rate, the hosting service may, for example, modify the image resolution and/or the number of frames/second of the video stream to be sent to the client. Also, the hosting service can adjust the quality level of the compressed video. When changing the resolution of the video stream, e.g., from a 1280×720 resolution to a 640×360 the video decompression logic on the client can scale up the image to maintain the same image size on the display screen.

In one embodiment, in a situation where the channel completely drops out, the hosting service 210 pauses the game. In the case of a multiplayer game, the hosting service reports to the other users that the user has dropped out of the game and/or pauses the game for the other users.

In one implementation of the method, detecting that the network connection has become impaired comprises detecting that the network latency has dropped below a specified threshold.

In one implementation of the method, the client periodically transmits messages to the server and/or the server periodically transmits messages to the client to ensure that the connection is usable.

In one implementation of the method, prior to resuming the execution of the application from the current point of execution upon detecting that the network connection has become usable or unimpaired, maintaining the application in a paused state until instructed by the user to continue execution.

In one implementation of the method includes generating a message instructing the user that the connection has become usable or unimpaired.

In one implementation of the method, wherein if the connection remains unusable or impaired for a specified period of time, then the server either (a) terminates the application, (b) saves the user's current state, and/or (c) saves the user's current state at a last allowed save interval.

In one implementation of the method, the application comprises a video game.

FIG. 4a of U.S. patent application Ser. No. 12/538,081 ('081 application), reproduced in the present application as FIG. 1a, shows a Hosting Service 210 that hosts applications running on Servers 402, that accept input from an Input device 421, received by Home or Office Client 415, and sent through the Internet 410 to Hosting Service 210. The Servers 402 are responsive to the input, and update their video and audio output accordingly, and which is then compressed through Low-Latency Video Compression 404, and the compressed video is then streamed through the Internet 410 to be decompressed by the Home or Office Client 415, and then displayed on Monitor or SD/HDTV 422. This system is an low-latency streaming interactive video system as more thoroughly described in the aforementioned "co-pending applications".

Figure 1B:
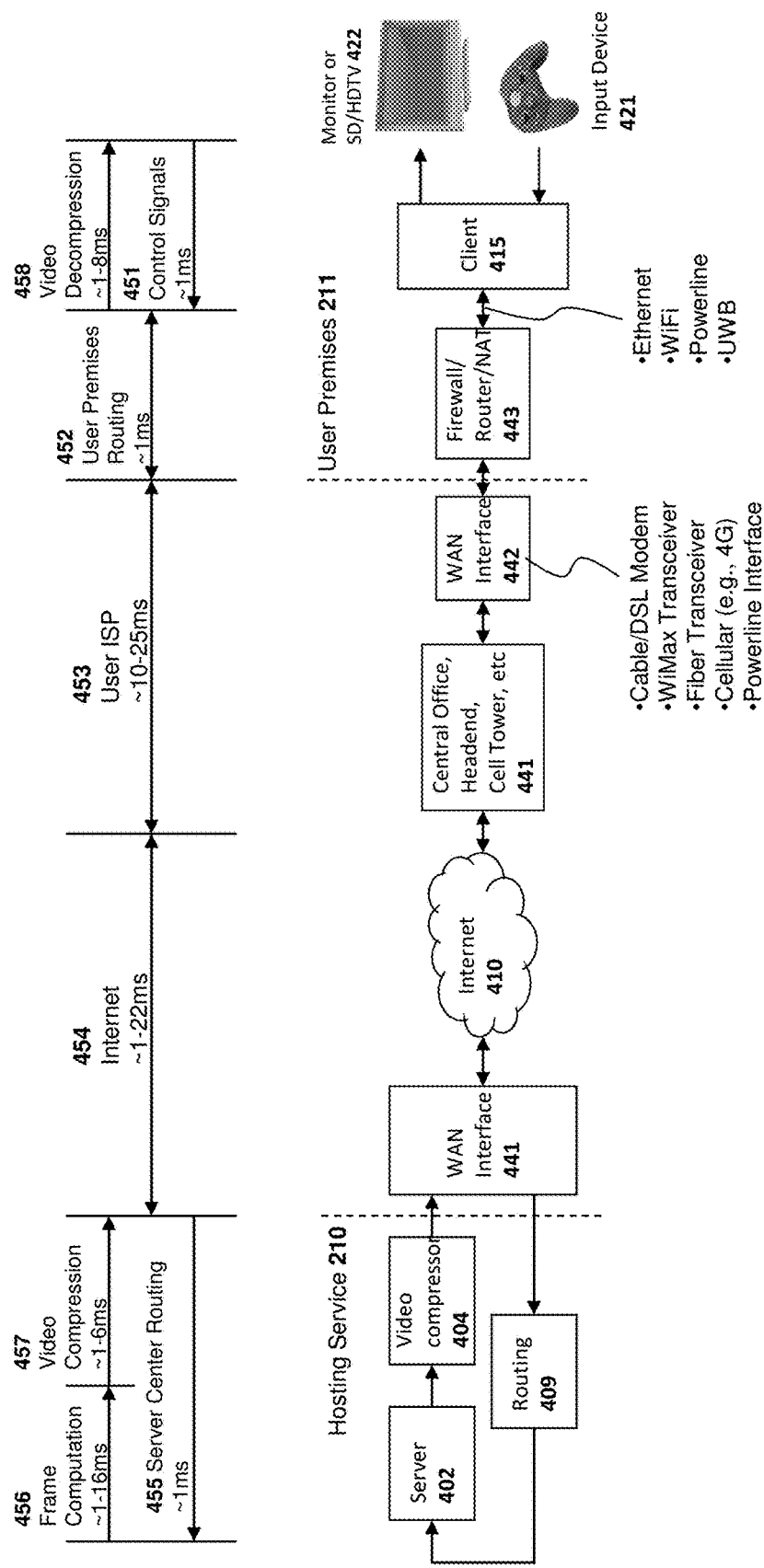
FIG. 1b illustrates exemplary latencies associated with communication between a client and hosting service.
Figure 2:
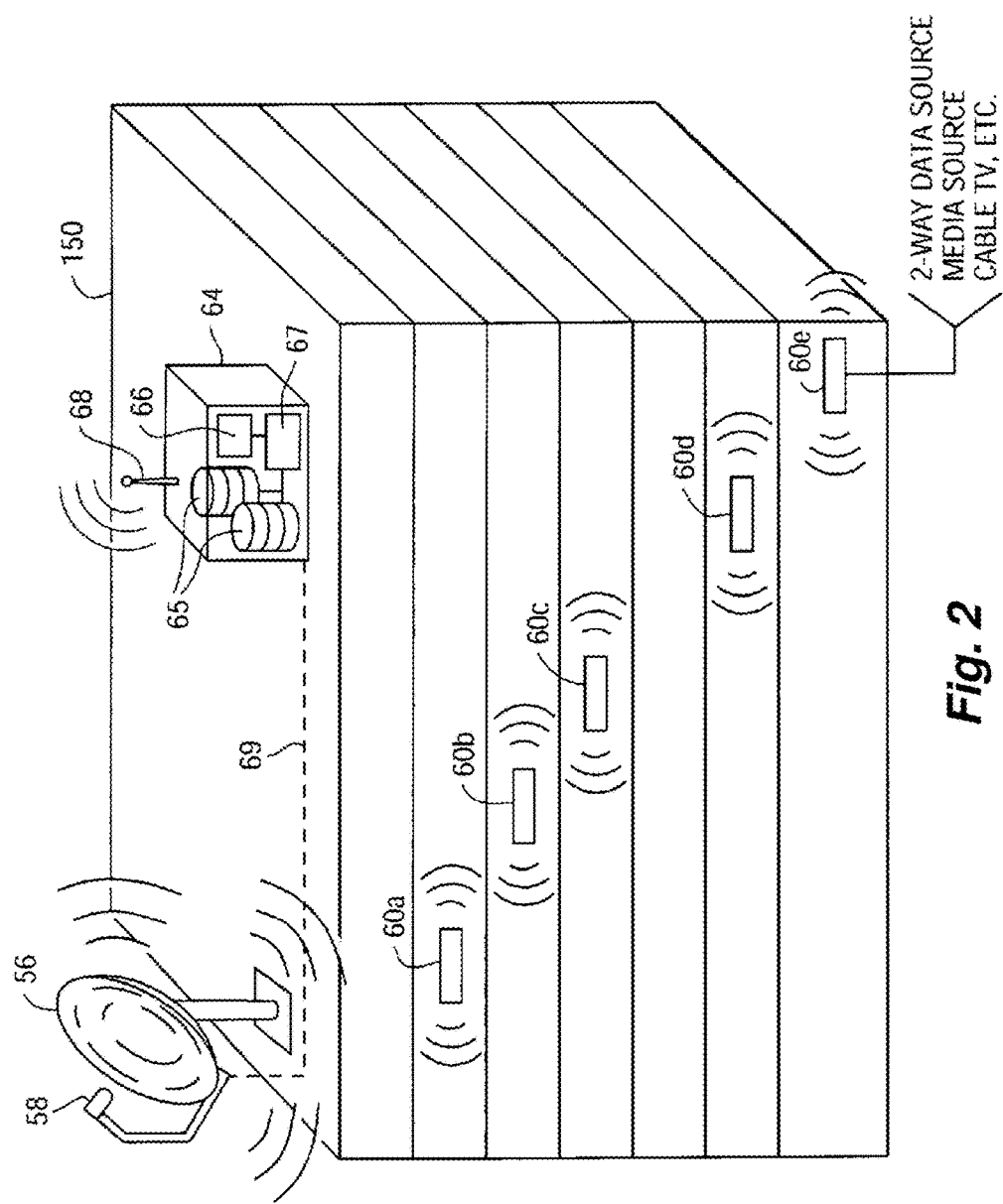
FIG. 2 shows the example of FIG. 4 optionally including a mass storage repository that functions as a media library according to another embodiment of the present invention.

As shown in FIG. 4b of '081, and in FIG. 7 of U.S. patent application Ser. No. 10/315,460 ('460 application), reproduced in the present application as FIG. 1b and FIG. 2, respectively, the network connection between the Hosting Service 210 Home and Office Client 415 may be implemented through a wide range of network technologies, of varying degrees of reliability, such as wired or optical fiber technologies that are typically more reliable and wireless technologies that may be subject to unpredictable interference or range limitations (e.g. Wi-Fi) and are typically less reliable. The '081 application describes techniques to address packet losses and other network impairments that may occur over such network connections. For example, the '081 application includes a section entitled "Dropped or Delayed Packets" which addresses these issues.

Almost all commercial and consumer Internet connections are subject to some impairments some of the time when packets are lost or delayed to the point where they are not usable for the intended application. Often, these impairments do not affect some, but not all, packets, so within a given short time interval (e.g. 1 second) at least some of the packets make it through. But, sometimes, there may be longer intervals (e.g. a minute or more) when either no packets are able to make it through a connection, or the number of packets are so few (in either or both directions) that the throughput of the connection has dropped to the point where it is not practical to send a low-latency compressed video/audio stream of sufficient quality or low enough latency for a given intended application (e.g. as described in the "co-pending applications", some applications can tolerate more impairments than others). Effectively, at this point, the connection is unusable or impaired for carrying low-latency streaming interactive video for the given application. In one embodiment, an encoder is used by the server to perform compression of video frames generated by a server executing a game application for streaming. The compression, in one example, may be a standard compression algorithm such as H.264 and MPEG-4. In one embodiment, a client will have a decoder, which is configured to decompress video frames received, when compressed by an encoder. More details regarding compression and decompression for video games is described in the above incorporated by reference applications.

There are many causes of long intervals where a connection is unusable for a given application. There may be congestion on the network, or a failure in one or more of the routers between the Hosting Service 210 and Home or Office or Client 204. Or, in the case of a wireless connection, there may be interference or congestion from other wireless sources or wireless network users. Also, in the case of wireless, it is possible the Home or Office Client 204 has moved beyond the usable range of the wireless network. Or, if Home or Office Client is a battery-powered device, it may put itself into sleep mode if the battery runs low or if it is preserving power, and during this time it may not be responsive to the network connection for receiving packets. While such intervals sometimes last for a very long duration, frequently such outages are relatively brief (e.g. 5 minutes or less), either because the impairment comes and goes, or because the user takes some action (e.g. moves back within range of a wireless network) to restore an adequate connection for the given application.

During the time the connection is impaired or unusable for the given application, a user's control of the application running on the Servers 402 through the low-latency streaming interactive video system described herein might be impaired or disabled entirely, but once the connection is restored, the user's control of the application would restored. In the case of some applications, for example some video games, if the application does not receive appropriate input from the user for a long interval, or if the user is unable to view and/or hear the video/audio from the application with high enough quality, or if the connection is disconnected entirely, then the application might proceed in an undesirable manner. For example, if the application is a driving game and the car controlled by the user is approaching a sharp turn before a cliff when the network connection is impaired or disconnected such that either the user's control input is unable to appropriately control the car, or if user is unable to see a good enough quality video (or any updated video) to see a sharp turn is coming up so as to provide input to appropriately turn the car, then the car might continue going forward, miss the turn and crash off the cliff.

To address this issue, in one embodiment, if the connection between the Server 402 and the Home or Office Client 204 is unusable or impaired, then the Server 402 pauses the application, until the connection is restored to an adequate level of quality (e.g. if there are impairments, the given application is still usable at given quality level), at which time the user is able to resume the application from where it had been paused. For example, in the driving game example, the game would have been paused prior reaching the sharp turn, and once the connection is restored, the game would be resumed, the user would see the sharp turn coming up, and the user could use the controls to appropriately turn the car upon reaching the sharp turn. As mentioned below, in one embodiment, the client and server may periodically transmit messages to one another to ensure that the connection is usable, or with a sufficient quality level, for the given application. Various different parameters may be used to determine whether the connection is at an adequate quality level. For example, the client or server may measure the latency and/or bandwidth of the connection. If the latency increases above or bandwidth drops below a specified threshold (e.g., a threshold designated for the particular game being played), then the server will pause the game. What is considered an adequate quality level for different applications may vary, and even what is considered an adequate quality level for a given applications may vary. Such quality thresholds may be specified by the developer or publisher of an application or the operator of the Hosting Service 210, each of whom may have a quality standard it wishes to maintain (e.g. for technical, aesthetic, or brand reputation reasons). Also, such quality thresholds may be specified by the user, who may be willing tolerate lower quality in general, or in certain situations (e.g. if stuck at airport waiting for a delayed flight, and only a poor quality network is available). In one embodiment, such quality thresholds may be set by the user, the operator of the Hosting Service 210, or by another party.

In one embodiment, when the connection is restored, the application remains in a paused state, so the user can decide when to resume the application. This is useful, for example, when the user does not know how long it will be before the connection is restored and may not have his or her attention focused on the application when the connection is restored. In one embodiment, a message will be displayed to the user indicating that the connection is once again at an adequate quality level (or that the connection is still not at an adequate quality level if such is the case).

In one embodiment, the application does not pause, but when the connection is restored the user can continue using the application in whatever state it has come to by the time the connection is restored. This could be useful in the case of an application that is a multiplayer game where many people are playing, and it would not be desirable to pause the game for all players because one player's connection is temporarily impaired or lost.

In one embodiment, all input devices are presumed to be in an inactive state when the connection is lost, but otherwise the application proceeds as normal. This may be useful in the case of a 3D design application where the user would not want any input action to continue (e.g. if the connection was lost when a keyboard letter key was in a "down" state, and if it remained in that state, the key would auto-repeat until the connection is restored), but the user would like a long-term rendering task the application is running to continue to run.

In on embodiment, a Server 102 that has lost a connection waits for a certain amount of time for the connection to be restored (e.g. 5 minutes), but if the connection is not restored by that time, then it either (a) terminates the application, (b) saves the user's current state (e.g. position in a game, or state in a productivity application), or (c) saves the user's current state at the last allowed save interval (e.g. in the case of many games, there are only certain points in the game where a user is permitted to save progress in the game).

In one embodiment, the Home or Office Client 204 presents the user with an indicator that shows how much time is left to restore the connection before the application is terminated (e.g. if it 5 minutes, then the user could be presented with a 5 minute countdown timer to know how long there is to restore the connection, or to bother waiting for the connection to be restored).

In one embodiment, the Home or Office Client 204 and Hosting Service 210 send each other periodic messages that indicate that the connection is working well. Thus, if either ceases to receive such messages (or if the messages indicate a problem with the connection), then this will serve as an indication that the connection has become impaired or unusable, and appropriate actions, such as those described previously, can be taken.

Elements of the disclosed subject matter may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present disclosure may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should also be understood that elements of the disclosed subject matter may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the disclosed subject matter may be downloaded as a computer program product, wherein the program may be transferred from a remote computer or electronic device to a requesting process by way of data signals embodied in a carrier wave or other propagation medium via a communication link (e.g., a modem or network connection).

Additionally, although the disclosed subject matter has been described in conjunction with specific embodiments, numerous modifications and alterations are well within the scope of the present disclosure. Accordingly, the specification and drawings are to be regarded in an illustrative rather than a restrictive sense.

The invention claimed is:

1. A hosting service including one or more servers and storage, the hosting service being implemented for streaming video games to connected clients over the Internet, wherein execution of video games is processed by the one or more servers of the hosting service, the hosting service is configured implement a method comprising:
   executing a video game on a server in response to user input from a client;
   compressing video output from the video game by an encoder to generate interactive compressed streaming video;
   transmitting the interactive compressed streaming video generated by the server over a network connection from the server to the client, the client is configured to have a decoder for decompressing the interactive compressed streaming video;
   detecting by the server that the network connection has become impaired, wherein detecting that the network connection has become impaired comprises detecting that a network latency has increased above a specified threshold;
   pausing, by the server without user input from the client, the execution of the video game from a current point of execution in response to detecting by the server that the network connection has become impaired;
   saving, by the server, a state associated with the current point of execution, the saving occurs after a period of time passes after the network connection was detected to have become impaired;
   generating a message for display at the client notifying that the network connection has become impaired; and
   resuming, by the server, the execution of the video game from the current point of execution after receiving input from the client to resume play of the video game, the user input from the client to resume the play of the video game enabled after the server notifies the client that the network connection has become unimpaired,
   wherein resuming execution of the video game also resumes transmission of the interactive compressed streaming video to the client while enabling user input from the client to control the play of the video game.

2. The method of claim 1, further comprising,
   periodically transmitting messages, from the server to the client, to determine a quality of the network connection.

3. The method of claim 1, wherein saving of the state further includes terminating execution of the video game by the server at a last allowed save interval.

4. A hosting service including one or more servers and storage, the hosting service being implemented for streaming video games to connected clients over the Internet, wherein execution of video games is processed by the one or more servers of the hosting service, the hosting service is configured implement a method comprising:

executing a video game on a server in response to user input from a client;
compressing video output from the video game by an encoder to generate interactive compressed streaming video;
transmitting the interactive compressed streaming video generated by the server over a network connection from the server to the client, the client is configured to have a decoder for decompressing the interactive compressed streaming video;
detecting by the server that the network connection has become impaired, wherein detecting that the network connection has become impaired comprises detecting that a network latency has increased above a specified threshold;
pausing, by the server without user input from the client, the execution of the video game from a current point of execution in response to detecting by the server that the network connection has become impaired;
generating a message for display at the client notifying that the network connection has become impaired; and
resuming, by the server, the execution of the video game from the current point of execution after receiving input from the client to resume the play of the video game, the user input from the client to resume play of the video game enabled after the server notifies the client that the network connection has become unimpaired,
wherein resuming execution of the video game also resumes transmission of the interactive compressed streaming video to the client while enabling user input from the client to control the play of the video game;
wherein detecting that the network connection has become impaired further comprises detecting that a network bandwidth has dropped below a predefined level;
wherein the predefined level is based on a bandwidth required to deliver real-time video of the video game to the client at a specified resolution.

5. The method of claim 4, wherein the specified resolution is dropped to maintain the transmitting of the interactive compressed streaming video.

6. The method of claim 5, wherein when the specified resolution is dropped the client is caused to scale up an image size on a display screen of the client.

7. A hosting service including one or more servers and storage, the hosting service being implemented for streaming video games to connected clients over the Internet, wherein execution of video games is processed by the one or more servers of the hosting service, comprising:

a server for executing a video game in response to user input from a client;
an encoder for compressing video output from the video game to generate interactive compressed streaming video; and
a network interface for transmitting the interactive compressed streaming video generated by the server over a network connection from the server to the client, the client is configured to have a decoder for decompressing the interactive compressed streaming video;
wherein the server is configured to detect that the network connection has become impaired, wherein detecting that the network connection has become impaired comprises detecting that a network latency has increased above a specified threshold;
wherein the server is configured to pause execution of the video game without user input from the client, the video game being paused from a current point of execution in response to detecting by the server that the network connection has become impaired;
wherein the server is configured to send a message for display of the client notifying that the network connection has become impaired;
wherein the server is configured to resume execution of the video game from the current point of execution after receiving input from the client to resume play of the video game, the user input from the client to resume the play of the video game enabled after the server notifies the client that the network connection has become unimpaired;
wherein the server is configured to save a state associated with the current point of execution and the saving occurs after a period of time passes after the network connection was detected to have become impaired.

8. The hosting service of claim 7, wherein resuming execution of the video game also resumes transmission of the interactive compressed streaming video to the client while enabling user input from the client to control the play of the video game.

9. The hosting service of claim 7, wherein the server detects that the network connection has become impaired based on a network bandwidth dropping below a predefined level.

10. The hosting service of claim 9, wherein the predefined level is based on a bandwidth required to deliver real-time video of the video game to the client at a specified resolution.

11. The hosting service of claim 7, wherein the server is configured to periodically transmit messages to the client or receive messages from the client to determine a quality of the network connection.

12. The hosting service of claim 7, wherein saving of the state further includes terminating execution of the video game by the server at a last allowed save interval.

13. The hosting service of claim 10, wherein the specified resolution is dropped by the server to maintain the transmitting of the interactive compressed streaming video.

14. Computer readable media for streaming video games to connected clients over the Internet, the computer readable media being non-transitory, comprising:

program instructions for executing a video game on a server in response to user input from a client;
program instructions for compressing video output from the video game by an encoder to generate interactive compressed streaming video;
program instructions for transmitting the interactive compressed streaming video generated by the server over a network connection from the server to the client, the client is configured to have a decoder for decompressing the interactive compressed streaming video;
program instructions for detecting by the server that the network connection has become impaired, wherein detecting that the network connection has become impaired comprises detecting that a network latency has increased above a specified threshold;
program instructions for pausing, by the server without user input from the client, the execution of the video game from a current point of execution in response to detecting by the server that the network connection has become impaired;

program instructions for generating a message for display at the client notifying that the network connection has become impaired;

program instructions for resuming, by the server, the execution of the video game from the current point of execution after receiving input from the client to resume play of the video game, the user input from the client to resume the play of the video game enabled after the server notifies the client that the network connection has become unimpaired, and program instructions for dropping a specified resolution to maintain the transmitting of the interactive compressed streaming video before pausing;

wherein resuming execution of the video game also resumes transmission of the interactive compressed streaming video to the client while enabling user input from the client to control the play of the video game.

15. The computer readable media of claim 14, further comprising, program instructions for saving, by the server, a state associated with the current point of execution;

wherein saving occurs after a period of time passes after the network connection was detected to have become impaired.

16. The computer readable media of claim 14, wherein when the specified resolution is dropped the client is caused to scale up an image size on a display screen of the client.

* * * * *